No. 633,516. Patented Sept. 19, 1899.
R. L. HUNTER.
CENTRIFUGAL ELECTRIC SWITCH.
(Application filed Jan. 18, 1898.)
(No Model.)
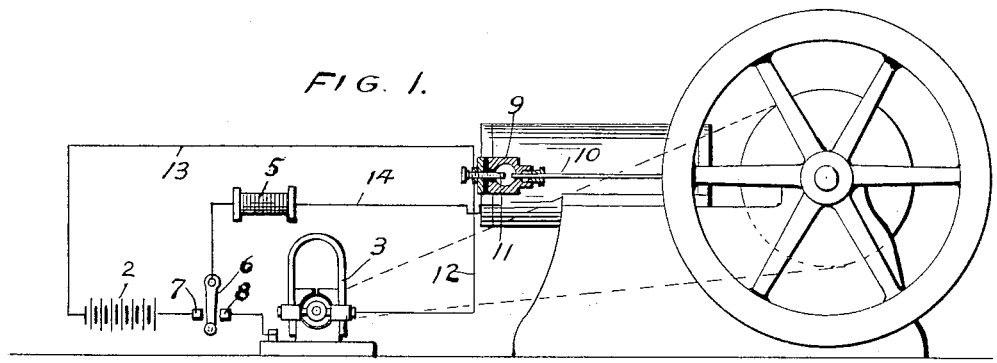
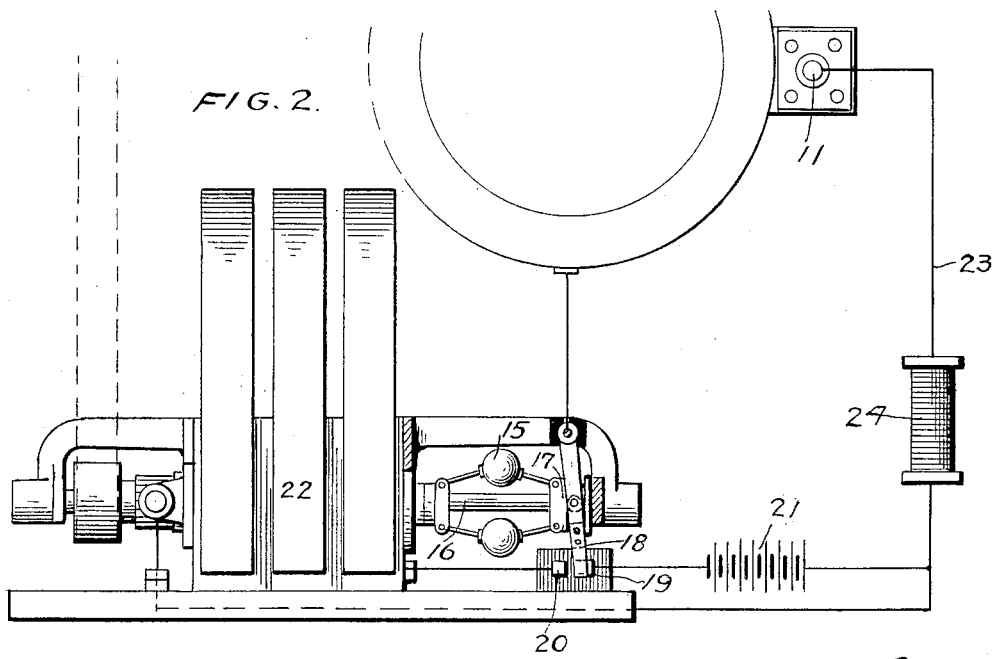
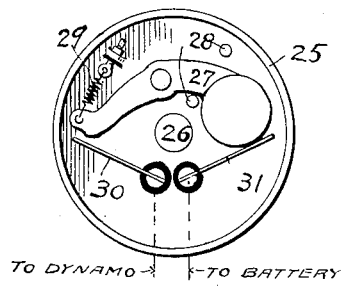
WITNESSES
INVENTOR.
ROBERT L. HUNTER.
BY Paul D Hawley
HIS ATTORNEYS.

UNITED STATES PATENT OFFICE.

ROBERT L. HUNTER, OF MINNEAPOLIS, MINNESOTA, ASSIGNOR TO THE AMERICAN SIGNAL AND POWER COMPANY, OF MINNESOTA.

CENTRIFUGAL ELECTRIC SWITCH.

SPECIFICATION forming part of Letters Patent No. 633,516, dated September 19, 1899.

Application filed January 18, 1898. Serial No. 667,044. (No model.)

*To all whom it may concern:*

Be it known that I, ROBERT L. HUNTER, of the city of Minneapolis, county of Hennepin, State of Minnesota, have invented certain new and useful Improvements in Centrifugal Electric Switches, of which the following is a specification.

The invention relates, primarily, to the automatic employment at different times of two sources of energy with a single translating device or group of translating devices, and the invention relates particularly to gas-engine igniters and means for connecting either one of two or more sources of energy therewith.

The invention further relates to an automatic centrifugal electric switch adapted for employment in connection with various electrical systems and devices.

One object of the invention is to arrange two sources of energy each with one terminal in constant connection with an igniter with means for connecting the other terminals of said sources of energy with said igniter at will.

Another object of the invention is to provide an automatic switch in connection with a moving translating device or part connected therewith, said switch being controlled by said translating device to automatically connect the same with one of two or more sources of energy.

A particular object of the invention is to provide an automatic switch in connection with the battery and dynamo belonging to the electric igniter of a gas-engine and to adapt said switch to automatically cut out the battery and connect the dynamo in circuit with the igniter when the engine attains a certain speed and reconnect the same with the battery when the speed of the engine is slackened to such an extent as to render the dynamo inoperative.

The invention consists generally in an electric switching or controlling apparatus, all as hereinafter described, and particularly pointed out in the claims, and will be more readily understood by reference to the accompanying drawings, forming part of this specification, and in which—

Figure 1 is a side view of a gas-engine, showing the igniter thereof and showing the electrical apparatus in diagrammatic form. Fig. 2 is a diagrammatic view illustrating the centrifugal switch. Fig. 3 illustrates a modification of the centrifugal electric switch.

In Fig. 1 I have illustrated my invention in connection with the electric igniter of a gasolene or gas engine. In this figure, 2 represents the battery, and 3 a small electric dynamo or magneto machine, which latter is driven from the crank-shaft 4 of the engine. 5 represents the coil, 6 the switch, and 7 and 8 the switch-points.

Any suitable igniter may be employed in connection with the firing-chamber 9 of the gas-engine. One of the points of contacts 10 of the igniter is electrically connected with the frame and base of the engine, while the other contact 11 is insulated therefrom in a suitable manner. This insulated contact-point is connected with one pole of the dynamo by a line 12 and is also connected with the primary battery 2 by a line 13. The other side 14 of the igniter-circuit includes the spark-coil 5 and the switch 6. One switch-point 7 is connected with the battery, and the other point 8 is connected with the opposite side of the dynamo to which the insulated contact 11 is connected.

The primary battery possesses a certain energy at all times, whether the engine is in operation or not, while the dynamo is a small one and is capable of furnishing the equivalent of the battery-current only after the engine has attained a certain speed. The dynamo cannot be used in starting the engine. Therefore before the fly-wheel of the engine is turned the switch 6 is placed upon the battery-point 7, thereby completing the battery-circuit through the spark-coil and the igniter, after which the automatically-operating igniter will cause the required electric sparks to ignite the charges in the engine-cylinder. The engine will soon attain its normal speed and will drive the dynamo at a high speed, at which speed the dynamo will develop a power equivalent to that of the battery, and the switch 6 may then be thrown upon the dynamo-point 8, thereby cutting out the battery and throwing the dynamo into circuit with the spark-coil and the igniter. By starting the engine with a primary, storage, or dry battery I am enabled to make use of a very small low-voltage dynamo or magneto which at the low speed of starting could not possibly furnish sufficient current for the purposes of the igniter, but which upon attaining a higher speed develops all of the power required therefor, so that the energy of the battery may be conserved.

I may use a simple manual switch (see Fig. 1) for connecting either the battery or the dynamo with the igniter or like translating device; but I prefer to employ a switch which operates automatically to cut out the battery and throw in the dynamo after the engine or other device upon which the dynamo is dependent has attained the proper speed. Such automatic devices are illustrated in Figs. 2 and 3.

In Fig. 2, 16 represents the armature-shaft of the electric machine, which shaft is driven from any suitable source of power, but preferably by the explosive-engine in connection with which the device is employed. On the shaft 16 is a centrifugal governor 15, having a sliding collar 17, that engages a contact or switch lever 18 and according to the operation of the governor is adapted to throw said switch-lever into contact with one or the other of the contact-points 19 and 20. To one contact-point the electric machine is connected, and to the other contact-point there is connected another source of energy—preferably a battery 21 is connected. The return-circuit from the translating device, which in this case is the igniter, is connected with the opposite side of the battery 21 to an opposite pole of the electric machine 22. The return side 23 of the circuit also includes the spark-coil 24, where the mechanism is employed as a switch between two sources of energy for the igniter of an explosive-engine.

The mechanism shown in Fig. 2 operates to automatically place the battery in circuit with the igniter when the speed of the engine is slackened, as when a heavy load is placed upon the engine or when the engine is stopped. On the other hand, when the engine runs at its normal speed, so that the predetermined speed of the dynamo is attained, then the dynamo will furnish sufficient current for the igniter and the governor will operate to move the switch-lever away from the battery-contact and upon the dynamo-contact, thereby cutting out the battery and throwing the dynamo into circuit with the igniter. The circuit of the igniter is completed by a connection with the switch-lever 17.

In Fig. 3, 25 represents a suitable pulley or disk mounted upon a shaft 26 and carrying a pivoted weight-arm 27. The movement of the weight-arm is preferably limited by stops 28 upon the disk, and the resistance of the arm to centrifugal force is adjusted by means of a suitable spring 29, attached to the arm and to the disk or pulley. The disk or pulley may itself be made one terminal of an electric circuit, and the disk preferably carries insulated springs or contact-fingers 30 and 31, with which the opposite ends of the weight-arm are adapted to engage according to the speed of the pulley or disk, the weight being thrown outward when the pulley attains a predetermined speed. This action will move the opposite end of the arm into engagement with the spring 30, which may represent a dynamo or other source of energy, while when the pulley ceases to rotate or its speed falls below a predetermined point then the weighted end of the arm will contact with the other spring 31, that may be connected with the battery or other contact source of power. The centrifugal switch is, as shown, adjustable and only comes in action with regard to the second source of power after the part on which the switch is mounted reaches a predetermined number of revolutions per minute. Instantly upon the slowing down of the shaft or engine or other part to which the switch is connected the switch will be operated to throw out the dynamo and place the other source of energy in circuit with whatever translating device is used. Thus at a critical moment when a heavy load is thrown upon the gas-engine and when its speed is reduced to such a point that a dynamo driven thereby would fail to furnish sufficient current for a spark the battery, at all times reliable, is brought into circuit to insure a perfect spark and the explosion necessary to accelerate the operation of the engine.

It is obvious that various modifications may be made in my invention without departing from the spirit thereof, and I therefore do not confine the same to the specific constructions herein shown and described.

Having thus described my invention, I claim as new and desire to secure by Letters Patent—

1. The combination, of a source of energy, with a translating device connected therewith, a second source of energy also connected with said translating device but incapable of furnishing sufficient power therefor except when driven at a predetermined speed, and means automatically and proportionally operative with respect to the second source of energy for automatically connecting the same or the first source of energy with said translating device according to the speed with which the second source of energy is driven, substantially as described.

2. The combination, of two sources of energy, one dependent upon a driving part, with a translating device and an automatically-operating electrical switch governed by said driving part and adapted to complete the circuit of either of said sources of energy with said translating device according to the action of said driving part, substantially as described.

3. The combination, of two sources of energy, one operable only under predetermined conditions, with a translating device, and automatic means subject to the conditions controlling said source of energy and adapted to include either of said sources of energy in the circuit of said translating device, substantially as described.

4. The combination, of two sources of electrical energy, one driven with a translating device, and a centrifugal switch operating with the driven source of energy and automatically operable to complete the circuits of said sources of energy with said translating device, substantially as described.

5. The combination, with two sources of energy, of a translating device having normally-open circuit connections with both sources of energy, and an adjustable centrifugal switch the operation of which is dependent upon the operation of said translating device and automatically operable to close the circuits of said sources of energy, substantially as described.

6. The combination, with distinct sources of energy, of a translating device having two terminals, one of which is connected with each source of energy, and a centrifugal switch having distinct connections for said sources of energy, and a common or single connection with the other terminal of said translating device, substantially as described.

7. The combination, with an explosive-engine and its electric igniter, of a dynamo-electric machine operated by said engine, a battery, said dynamo and said battery each having a terminal connected with said igniter, a common return including a spark-coil, and an automatic centrifugal switch interposed between said common return and said battery and dynamo, and whereby either thereof may be connected with said common return to complete the circuit of said igniter, substantially as described.

8. The combination, with a varying source of energy, of a constant source of energy, a translating device having distinct circuit connections with said sources of energy, and an automatic centrifugal switch suitably governed by a device or member whereon said translating device is dependent for its operation, and said switch adapted to complete the circuit of said translating device with either of said sources of energy, substantially as described.

9. The combination with an explosive-engine and its electric igniter, of a dynamo-machine operated by said engine, a battery, said dynamo and said battery each having a terminal in said igniter, a common return to said battery and dynamo from said igniter, a spark-coil in said return, and an automatic electric switch interposed between said common return and said battery and dynamo and operable automatically according to the speed at which said engine operates, wherefrom said dynamo is driven, to electrically connect or complete the circuit of said battery or the circuit of said dynamo with said igniter, substantially as described.

10. The combination with a varying source of energy of a constant source of energy, a translating device having distinct circuit connections with said sources of energy, a source of physical energy dependent for its operation upon said translating device and an automatic, regulable, electric switch governed by said source of physical energy to complete the circuits of said translating device with either of said first-mentioned sources of energy, substantially as described.

11. The combination of a source of energy, with a translating device connected therewith, a second source of energy also connected with said translating device but incapable of furnishing sufficient power therefor except when driven at a predetermined speed, and automatic means for operatively connecting either of said sources of energy with said translating device, substantially as described.

In testimony whereof I have hereunto set my hand this 12th day of January, 1898.

ROBERT L. HUNTER.

In presence of—
C. G. HAWLEY,
M. E. GOOLEY.